April 14, 1925.  
S. G. CRANE  
1,533,101  
DASHPOT MOUNTING  
Filed Nov. 21, 1919  
3 Sheets-Sheet 1

Witnesses  
W. H. Lybrand  
C. E. Wilcox

Inventor  
Samuel G. Crane  
By George R. Frye  
Attorney

April 14, 1925.  
S. G. CRANE  
DASHPOT MOUNTING  
Filed Nov. 21, 1919  
1,533,101  
3 Sheets-Sheet 2
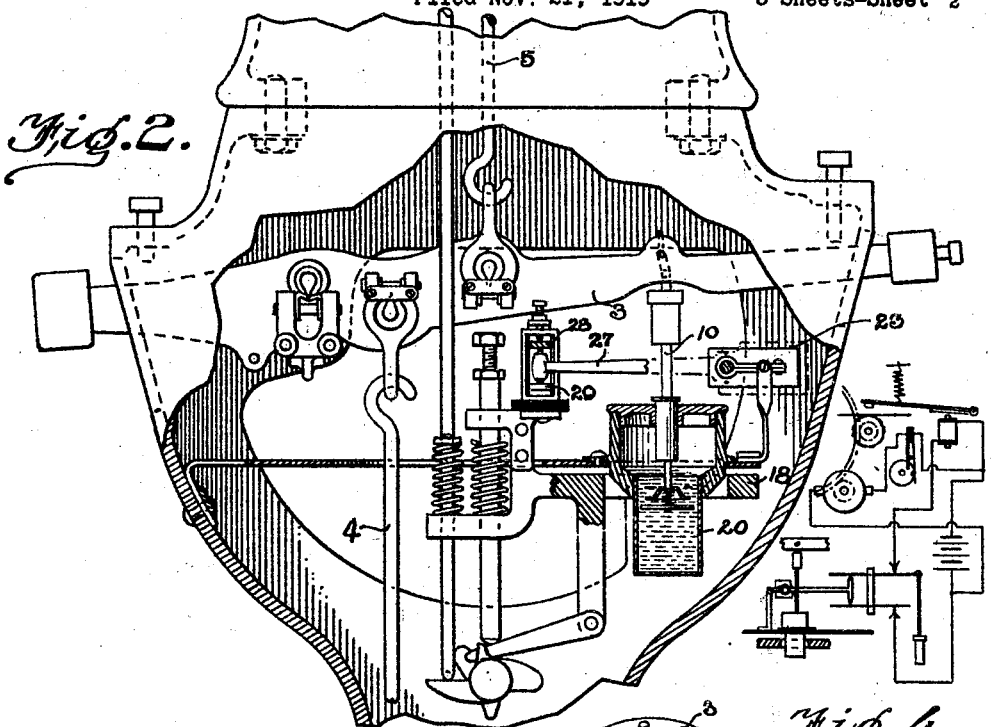
Fig. 2.
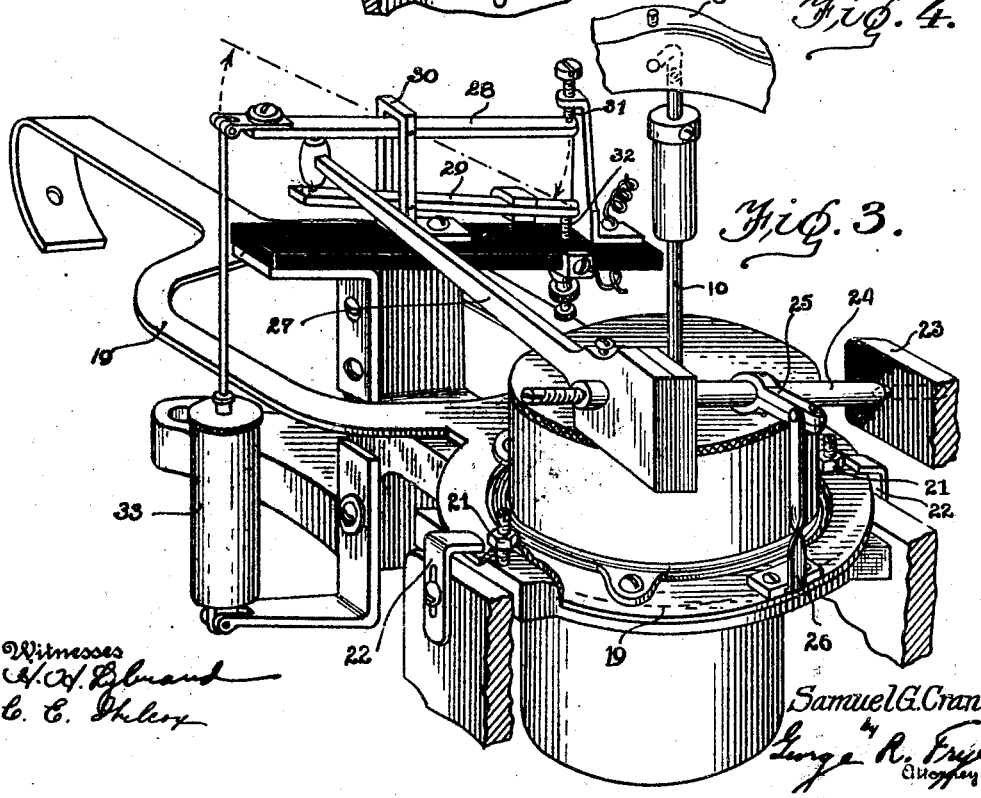
Fig. 3.
Fig. 4.
Witnesses  
Samuel G. Crane  
George R. Frye  
Attorney April 14, 1925.
S. G. CRANE
1,533,101
DASHPOT MOUNTING
Filed Nov. 21, 1919
3 Sheets-Sheet 3
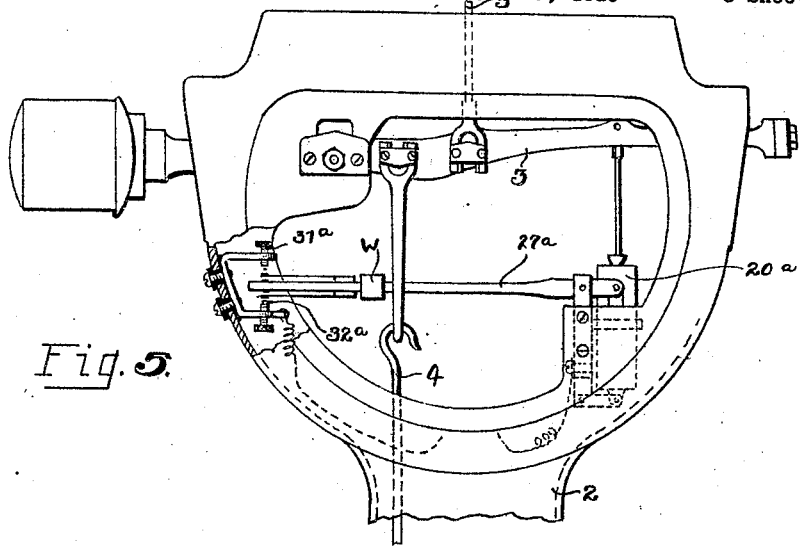
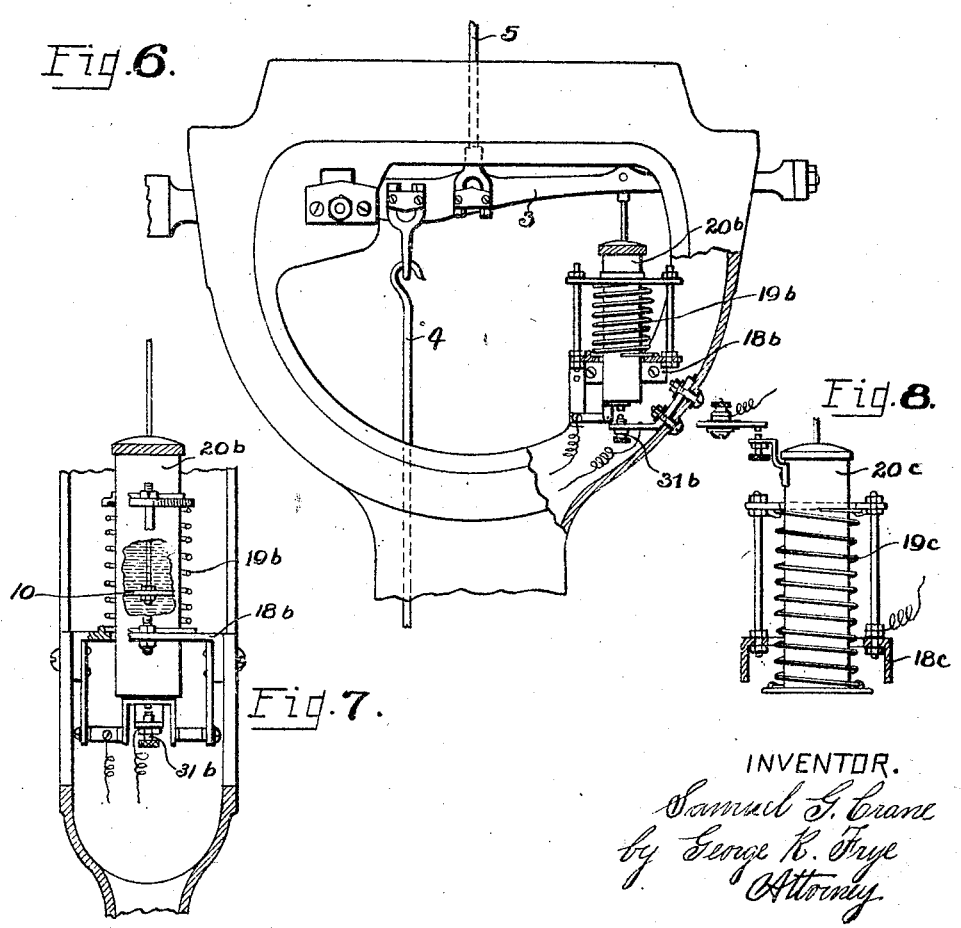
INVENTOR.
Samuel G. Crane
by George R. Frye
Attorney Patented Apr. 14, 1925.

1,533,101

UNITED STATES PATENT OFFICE.

SAMUEL G. CRANE, OF TOLEDO, OHIO, ASSIGNOR TO TOLEDO SCALE COMPANY, OF TOLEDO, OHIO, A CORPORATION OF NEW JERSEY.

DASHPOT MOUNTING.

Application filed November 21, 1919. Serial No. 339,689.

*To all whom it may concern:*

Be it known that I, SAMUEL G. CRANE, a citizen of the United States, residing at Toledo, in the county of Lucas and State of Ohio, have invented certain new and useful Improvements in Dashpot Mountings, of which the following is a specification.

This invention relates to mountings for dash pots and similar shock absorbing devices such as are commonly used to retard or dampen the movements of machine parts, and is particularly adapted for use in weighing scales.

When mechanism which is connected to a dash pot containing an incompressible fluid as a shock absorbing medium is given a sudden impulse, the inertia of the fluid causes it to momentarily resist the movement with substantially the inflexibility of an inelastic solid, thereby subjecting the mechanism to severe shocks and strains. One of the objects of this invention is to so mount the dash pot as to eliminate excessive resistance to sudden movement.

It is very difficult to connect auxiliary mechanism to the weighing mechanism of a scale to be operated thereby without in some degree affecting the accuracy of the weighing mechanism. Another object of this invention is to obviate this difficulty by so mounting the dash pot that the movement of the plunger therein will be communicated to the dash pot, thereby providing a device which may be utilized for the actuation of the auxiliary mechanism without in any degree affecting the accuracy of the weighing mechanism.

Another object of the invention is to so mount the dash pot that it may perform the function of the timing device for the auxiliary mechanism as well as that of the shock absorber for the weighing mechanism.

Another object is to so combine a movable dash pot with an electric switch that said switch will be opened and closed by movement of said dash pot without injuriously interfering with the ordinary function thereof.

With the above and other objects in view which will readily appear as the invention is better understood, my invention consists in the novel construction, combination and arrangement of parts to be hereinafter more fully described and particularly pointed out in the appended claims.

Reference is to be had to the accompanying drawings illustrating preferred embodiments of my invention and wherein similar reference numerals designate similar parts throughout the several views.

In the drawings:—

Figure 2 is a detail view of a dash pot mounting showing a timing switch connected therewith, some of the parts being shown in section;

Figure 3 is a detail perspective view of the operative parts of the mechanism shown in Figure 2;

Figure 4 is a diagrammatic view of a portion of the mechanism of a printing weighing scale of the type shown in Figure 1, embodying my invention;

Figures 5 and 6 are front elevations, with parts broken away, of portions of weighing scales embodying modified forms of my invention;

Figure 7 is a detail side elevation of a portion of the mechanism shown in Figure 6; and Figure 8 is an elevational view, with parts in section, of still another modification of my invention.

Figure 1:
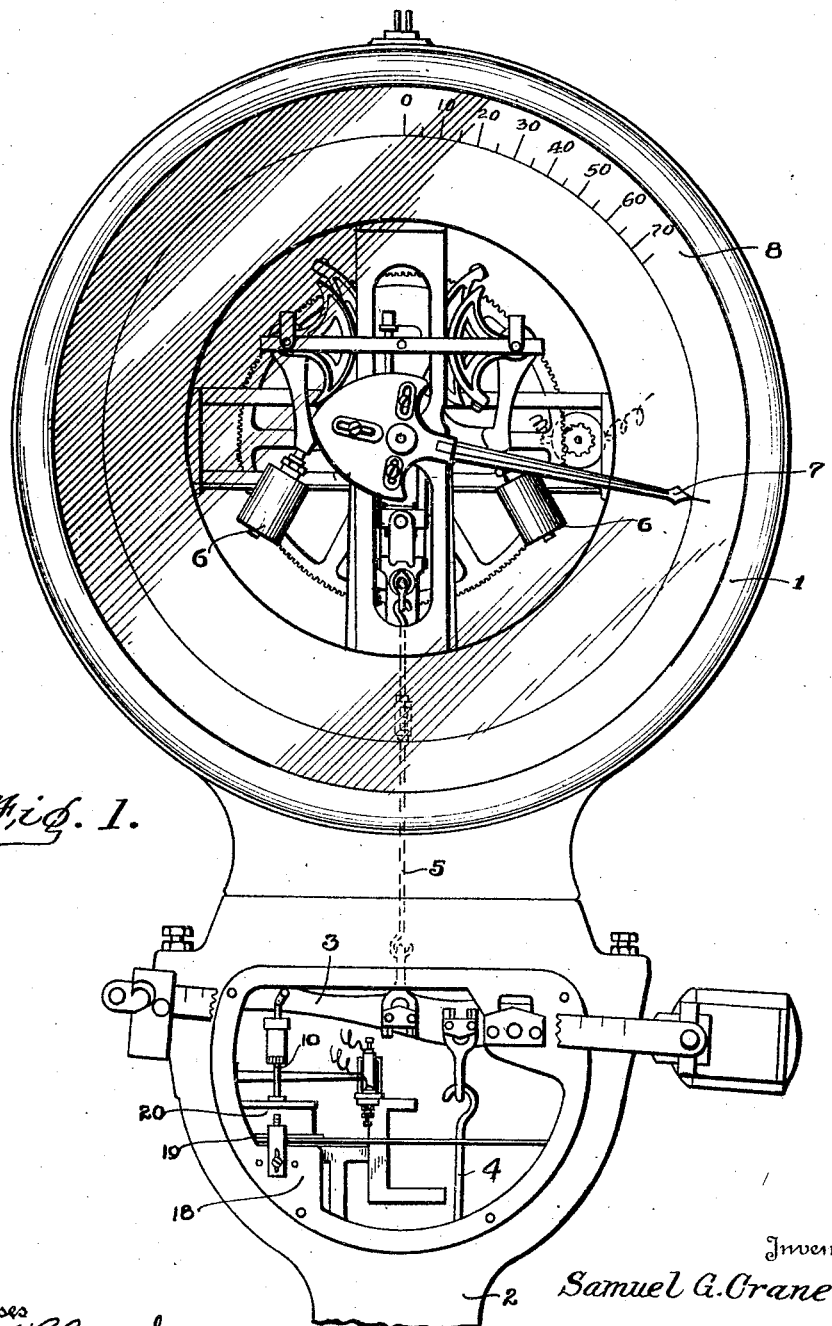
Figure 1 is a front elevation, with parts removed, of a printing weighing scale having a dash pot mounted according to one form of my invention.

In the drawings I have illustrated my invention in connection with an automatic weighing scale, and my invention is particularly adapted for use therewith. It is to be understood, however, that it may be employed with other types of scales and also upon other machines in which shock absorbers are or may be advantageously used.

Since the weighing and printing mechanisms form no part of the present invention, I have shown them only in such detail as is reasonably necessary to clearly show the connection of my invention therewith. The weighing mechanism is of a well-known type and the printing mechanism is fully described in my co-pending application Ser. No. 339,688 filed on even date herewith. The weighing and printing mechanisms will therefore be herein referred to in general terms only, and no attempt will be made to delineate the action thereof except as they enter into the action of the dash pot mounting forming the claimed invention herein.

Referring now to the drawings in detail, and particularly to Figures 1, 2, 3 and 4, the scale is provided with a housing 1 enclosing the automatic mechanism, the housing being supported upon a column 2 in the upper end of which is mounted a tare beam lever 3, the tare beam lever being connected to the platform mechanism (not shown) by means of the steelyard 4 passing downwardly through the column 2. A link 5 extends upwardly from the lever and operatively connects the automatic weighing mechanism therewith. The automatic weighing mechanism includes a pair of oppositely-swinging pendulums 6. When a load is placed upon the platform of the scale a downward pull is exerted upon the steelyard 4 and through the lever 3 upon the link 5, which is so connected to the pendulums 6 as to cause them to swing outwardly and upwardly, thereby offsetting the load on the platform. Operatively connected to the pendulum mechanism is an index 7 which moves over a dial 8 and thus registers the weight on the platform. Connected to the lever 3 so as to dampen the movement thereof is a dash pot 20, the connection with the lever 3 operating through a plunger 10 movably mounted in the dash pot. In lieu of the rigid bracket ordinarily employed to support dash pots of this kind I have provided a resilient member in the form of a flat spring 19 which is securely fastened to one side of the column 2 and extends across the upper portion thereof, and which is suitably shaped to provide an elongated opening surrounding portions of the scale mechanism extending through the column, such as the steelyard 4 connecting the platform lever to the lever 3. Mounted upon the free end of the resilient member 19 is a dash pot 20, the lower portion of which extends through an opening in the bracket 18 mounted in the column 2, thereby permitting the dash pot to swing with the resilient member. Limiting means are preferably provided to prevent undue swinging of the dash pot and resilient member, as herein shown comprising adjusting screws 21 mounted in the member 19 adjacent the dash pot and adapted to contact with the bracket 18 when the limit of downward movement of the dash pot has been reached. A plurality of L-shaped guides 22 are adjustably mounted upon the column 2, the short arms of said guides being adapted to extend over the edge of the member 19 and limit the upward movement thereof. Secured within the column 2 and above the resilient member are brackets 23 in which is journaled a transverse rock shaft 24 having needle point or other suitable anti-friction bearings and carrying an arm 25 which is pivotally connected to the resilient member 19 by the link 26. The rock shaft also carries an arm 27 of much greater length than the arm 25 and extending in the opposite direction, the outer extremity of which arm operates between the shorter arms of upper and lower contact levers 28 and 29 respectively, the contact levers being fulcrumed upon the upright 30. The extremities of the longer arms of the contact levers 28 and 29 are adapted to engage the upper and lower contact screws 31 and 32 carried by but insulated from the bracket 18. The upper lever 28 has its shorter arm operatively connected with the timing device 33, the purpose of which will later appear. The plunger of the dash pot 20 is operatively connected with the scale beam 3 by means of a plunger rod, and serves to dampen the vibratory movements of the delicate parts of the scale.

Thus, it will be apparent that while the weighing mechanism of the scale is in operation the scale beam 3 will be caused to vibrate, which will force the plunger rod to reciprocate within the liquid contained in the cylinder of the dash pot. As the dash pot is suspended from the free end of the resilient member 19, the action of the plunger in the liquid will impart a vibrating movement to the dash pot, which will cause the shaft 24 to be rocked by reason of the crank arm 25 and link 26. The rocking of the shaft 24 causes the arm 27 to alternately engage the shorter arms of the contact levers 28 and 29 and break the engagement of the longer arms with the contact screws 31 and 32. When the lever 3 is pulled downwardly the dash pot 20 is moved correspondingly, causing the free end of the arm 27 to move upwardly and breaking the contact of the upper contact lever 28 with the contact screw 31. The shorter arm of this lever 28 is connected to the timing device 33, which retards the movement of the lever 28 in resuming its normal position in engagement with the contact screw 31. Thus, it will be seen that as long as the vibratory movement of the scale mechanism and the consequent vibratory movement of the dash pot continue, the switch constituted by the contact levers 28 and 29 and the contact screws 31 and 32 will be kept open.

In the embodiment shown in Figures 1 to 4, the movement of the weighing mechanism operates to open a switch. The invention in its broad aspect, however, is not limited to devices having this specific operation. The movable mechanism may, on the contrary, be utilized to operate with devices of various kinds. In Figures 5 and 6, for examples, I have shown modifications in which switches are closed by movement of the weighing mechanism. In the modification illustrated in Figure 5 the dash pot 20$^a$ is pivotally supported in bifurcations at one end of the lever 27$^a$. The lever carries a weight W which is so set as to slightly overbalance the dash pot so that the contact end of the lever is normally supported by the insulated tip of the screw 32ª. When the lever 3 is moved downwardly the dash pot is carried with it and the contact in the opposite end of the lever 27ª is brought into engagement with the contact screw 31ª and remains in engagement therewith until the dash pot rises to its normal position.

In the modification shown in Figures 6 and 7 the dash pot is mounted upon a helical spring 19ᵇ which is carried upon a bracket 18ᵇ rigidly attached to the column 2. The lower end of the dash pot carries a contact point which engages the contact screw 31ᵇ when the dash pot is depressed by reason of downward movement of the lever 3. As the fluid in the dash pot passes the plunger, the spring expands and again raises the dash pot and opens the circuit. By suitably proportioning the parts the circuit may be caused to remain closed only momentarily to set in motion a train of mechanism, or it may be arranged to remain closed for longer periods.

In the modification shown in Figure 8 the dash pot 20ᶜ is mounted upon a retractile spring 19ᶜ supported by the bracket 18ᶜ, and a contact screw carried at the upper end of the dash pot is arranged to be moved away from the stationary contact point to break the circuit as the dash pot moves downwardly. The period during which the circuit is to remain open can obviously be varied by suitably proportioning and adjusting the parts.

While it will be apparent that the illustrated embodiments of my invention herein disclosed are well calculated to adequately fulfill the objects primarily stated, it is to be understood that the invention is susceptible to variation, modification and change without departing from the spirit and scope of the invention as set forth in the subjoined claims.

Having described my invention, I claim:

1. In a machine of the class described, in combination, a frame, a movable element, a resilient member supported on said frame, a dash pot carried by said resilient member, a plunger connected to said movable element and reciprocally received in said dash pot, and means for controlling auxiliary mechanism arranged to be operated by movement of said dash pot.

2. In a machine of the class described, in combination, a frame, a movable element, a resilient member supported on said frame, a dash pot carried by said resilient member, a plunger connected to said movable element and reciprocally received in said dash pot, and an electric switch arranged to be operated by movement of said dash pot.

3. The combination with the frame and weighing mechanism of a scale, of a flat spring supported at one end by said frame, a dash pot carried by the other end of said spring and operatively connected to said weighing mechanism.

4. The combination with the frame and weighing mechanism of a scale, of a flat spring supported at one end by said frame, said spring having an opening in its end to form a seat for a dash pot and an opening in its center to allow the passage of mechanism, and a dash pot supported in the opening in the end of the spring and operatively connected to said weighing mechanism, a part of said weighing mechanism passing through the opening in the center of the spring.

SAMUEL G. CRANE.

Witnesses:
C. O. MARSHALL,
C. E. WILCOX.